US00RE49372E

(19) United States
(12) Reissued Patent
Vergara

(10) Patent Number: US RE49,372 E
(45) Date of Reissued Patent: Jan. 17, 2023

(54) CROSSBOW COCKING APPARATUS

(71) Applicant: Eastman Outdoors, LLC, Superior, WI (US)

(72) Inventor: David Vergara, White Lake, MI (US)

(73) Assignee: FERADYNE OUTDOORS, LLC, Superior, WI (US)

(21) Appl. No.: 16/804,911

(22) Filed: Feb. 28, 2020

Related U.S. Patent Documents

Reissue of:
(64) Patent No.: 10,295,299
Issued: May 21, 2019
Appl. No.: 16/068,503
PCT Filed: Jan. 12, 2017
PCT No.: PCT/US2017/013091
§ 371 (c)(1),
(2) Date: Jul. 6, 2018
PCT Pub. No.: WO2017/123687
PCT Pub. Date: Jul. 20, 2017

U.S. Applications:
(60) Provisional application No. 62/277,744, filed on Jan. 12, 2016.

(51) Int. Cl.

| | |
|---|---|
| ***F41B 5/12*** | (2006.01) |
| ***F41B 5/14*** | (2006.01) |
| ***B66D 1/04*** | (2006.01) |
| ***B66D 1/06*** | (2006.01) |

(52) U.S. Cl.
CPC ..... *F41B 5/1469* (2013.01); *B66D 1/04* (2013.01); *B66D 1/06* (2013.01); *F41B 5/12* (2013.01)

(58) Field of Classification Search
CPC . F41B 5/1469; F41B 5/12; B66D 1/04; B66D 1/06
See application file for complete search history.

(56) References Cited

U.S. PATENT DOCUMENTS

| | | | | |
|---|---|---|---|---|
| 6,616,129 | B1 * | 9/2003 | Lee | A45B 25/00 135/20.3 |
| 7,100,590 | B2 * | 9/2006 | Chang | F41B 5/123 124/25 |
| 8,443,790 | B2 | 5/2013 | Pestrue | F41B 5/12 124/25 |

(Continued)

FOREIGN PATENT DOCUMENTS

WO WO-2017123687 A1 * 7/2017 ..... F41B 5/12

*Primary Examiner* — Joseph A Kaufman
(74) *Attorney, Agent, or Firm* — Greenberg Traurig, LLP

(57) ABSTRACT

A cocking mechanism is disclosed. The cocking mechanism comprises an actuator assembly, a hand crank assembly, and a bow string hook assembly. The actuator assembly further comprises clutch assembly having a bearing housing, a bearing cage, a support axle and bearing elements. The bearing housing is defined by an inner peripheral surface having a plurality of inwardly extending annular ramps, wherein the bearing elements contact a portion of the ramps to prevent rotation of the support axle in a first direction, but allows for rotation of the support axle in a second direction when the actuator assembly is in a locked configuration. This provides for immediate braking action against any unforeseen forward motion of the bow string of a crossbow such as when inadvertently or accidently releasing the removable hand crank assembly during the cocking operation.

37 Claims, 11 Drawing Sheets

(56) References Cited

U.S. PATENT DOCUMENTS

| | | | | |
|---|---|---|---|---|
| 8,453,631 | B1 * | 6/2013 | Kronengold | F41A 19/12 124/25 |
| 8,578,917 | B2 * | 11/2013 | Bednar | F41B 5/1469 124/25 |
| 8,689,774 | B1 * | 4/2014 | Ritz | F41B 5/1469 124/25 |
| 8,950,385 | B1 * | 2/2015 | Khoshnood | F41B 5/12 124/25 |
| 9,341,434 | B2 * | 5/2016 | McPherson | F41B 5/1469 |
| 9,404,706 | B2 * | 8/2016 | Khoshnood | F41B 5/1469 |
| 9,752,844 | B1 * | 9/2017 | Huang | F41B 5/12 |
| 10,421,637 | B1 * | 9/2019 | Huang | B65H 75/4494 |
| 10,948,257 | B1 * | 3/2021 | Huang | B65H 75/4494 |
| 11,067,357 | B1 * | 7/2021 | Chu | F41B 5/1449 |
| 2006/0169258 | A1 * | 8/2006 | Chang | F41B 5/1469 124/25 |
| 2009/0277435 | A1 * | 11/2009 | Pestrue | F41B 5/12 124/25 |
| 2010/0170487 | A1 * | 7/2010 | Kronengold | F41A 19/12 124/25 |
| 2015/0040883 | A1 * | 2/2015 | McPherson | F41B 5/1469 124/88 |

* cited by examiner

CROSSBOW COCKING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is for a reissue of U.S. Pat. No. 10,295,299 B2 issued May 21, 2019, which* is a National Stage application under 35 U.S.C. 371 ("371 Application") of International Patent Application No. PCT/US2017/013091 filed Jan. 12, 2017, which claims the benefit of U.S. Provisional Patent Application No. 62/277,744 filed Jan. 12, 2016, all of which are herein incorporated by reference in their entirety.

STATEMENT REGARDING FEDERALLY SPONSORED RESEARCH OR DEVELOPMENT

Not applicable.

TECHNICAL FIELD

The disclosure relates to crossbows. More specifically, the disclosure relates to a cocking mechanism for a crossbow.

BACKGROUND

The use of crossbows for hunting has increased in recent years, especially for those who are elderly, disabled or young, where using a traditional bow or a compound bow may be too physically strenuous. Indeed, crossbows offer these individuals an opportunity to hunt or shoot a bow much more easily. For others, shooting with crossbows may offer variety over using only a traditional bow, or they may simply enjoy using a crossbow.

However, crossbows in general have a very large drawing force, making them difficult to cock without the use of force-multiplying tools. This difficulty is especially true for elderly, disable and young users that may not have the necessary strength and dexterity to cock the crossbow. Further, when on an active hunt, it is desirable to be as quiet as possible when cocking the crossbow, so as not to scare any prey.

While there are known crossbow cocking devices, there exists a need for a quiet or "silent" crossbow cocking that allows for ease of use.

SUMMARY

A cocking mechanism is disclosed. The cocking mechanism comprises an actuator assembly, a hand crank assembly, and a bow string hook assembly. The actuator assembly further comprises clutch assembly having a bearing housing, a bearing cage, a support axle and bearing elements. The bearing elements operatively cooperate with the bearing housing to prevent rotation of the support axle in a first direction, but allow for rotation of the support axle in a second direction when the actuator assembly is in a locked configuration. This provides for immediate braking action against any unforeseen forward motion of the bow string of a crossbow such as when inadvertently or accidently releasing the removable hand crank assembly during the cocking operation.

In another exemplary arrangement, a crossbow having a cocking mechanism is disclosed. The crossbow has a frame, a bow string assembly, first and second limbs and a riser. The bow string assembly is disposed between the first and second limbs and the first and second limbs are attached to the riser. The cocking mechanism for cocking the bow string assembly connected to the crossbow frame, includes an actuator assembly, a hand crank assembly, and a bow string hook assembly. The actuator assembly further comprises clutch assembly having a bearing housing, a bearing cage, a support axle and bearing elements, the bearing element being operatively mounted within the bearing housing to prevent rotation of the support axle in a first direction, but allow for rotation of the support axle in a second direction when the actuator assembly is in a locked configuration.

DETAILED DESCRIPTION

Figure 1:
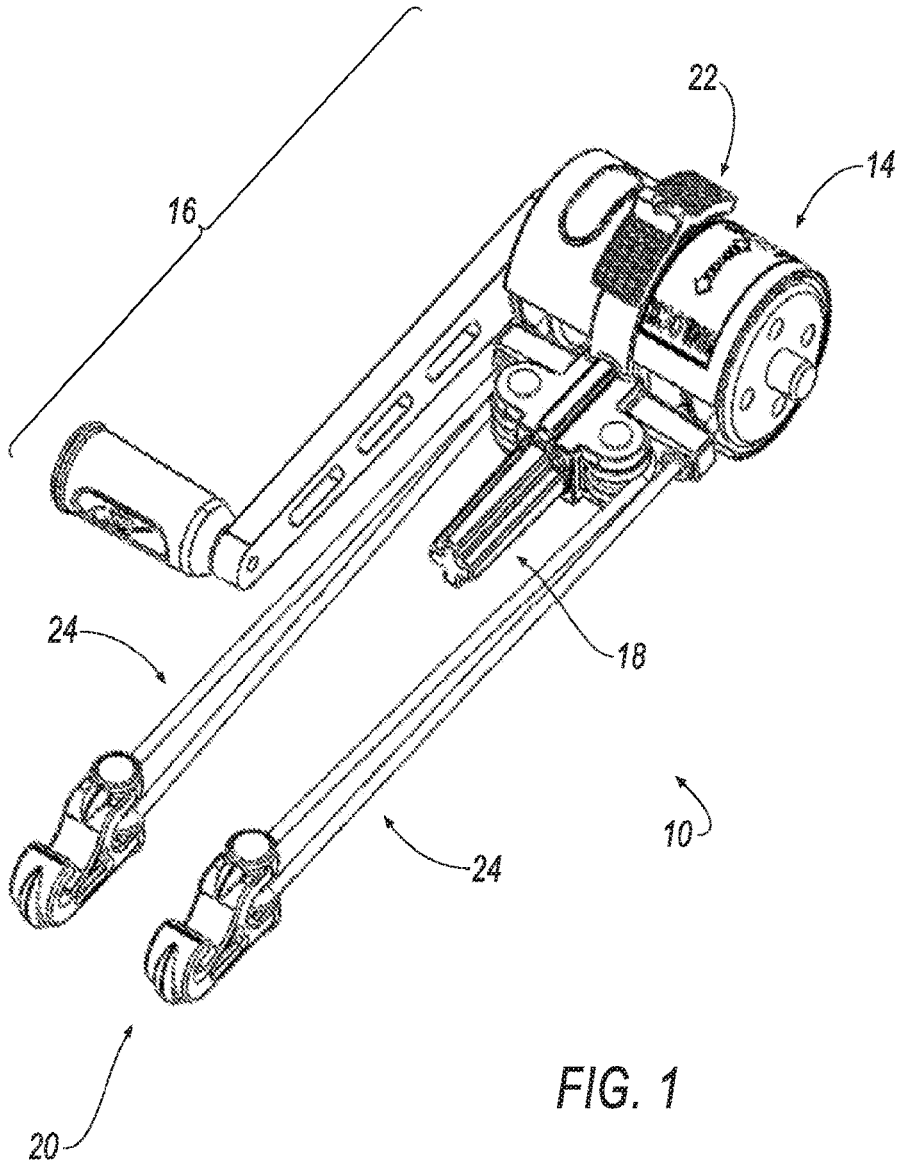
FIG. 1 is a perspective view of a cocking mechanism for use with a crossbow.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-6 of the drawings, an improved cocking mechanism 10 is illustrated. The cocking mechanism 10 is providing for attaching to a crossbow 12 (FIGS. 2-5), and more specifically for use in cocking the crossbow 12.

In exemplary arrangement, the cocking mechanism 10 comprises an actuator assembly 14, a selectively removable hand crank assembly 16, and a bow string hook assembly 20. In one exemplary arrangement, an optional alignment member 18 may be provided. An actuator lock member 22 is operatively mounted to the actuator assembly 14. Tension cables 24 are part of the string hook assembly 20 and are operatively connected to the actuator assembly 14, as will be discussed in further detail below.

Figure 2:
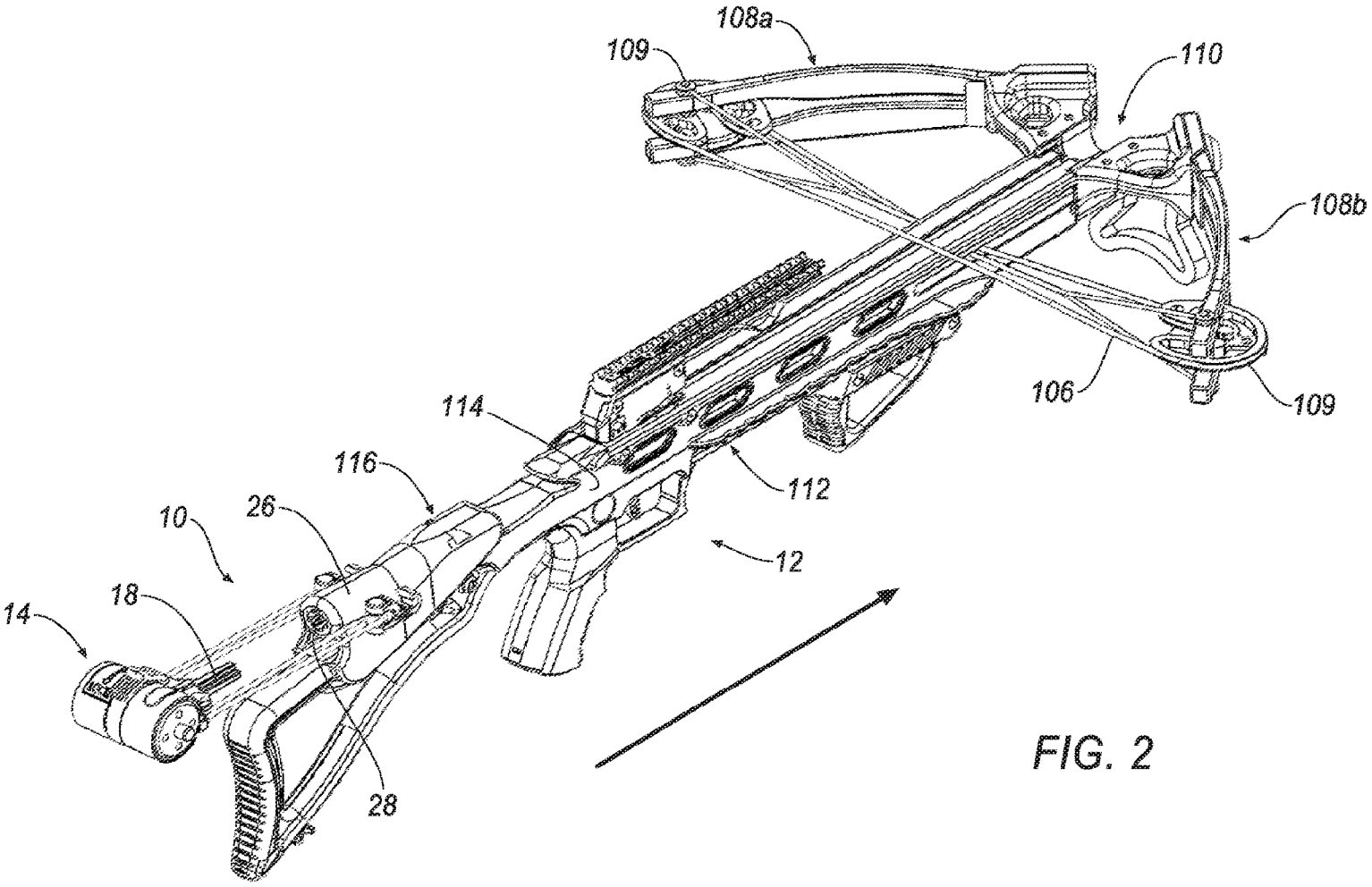
FIG. 2 is a perspective view of the cocking mechanism of FIG. 1, mounted to a crossbow.
Figure 3:
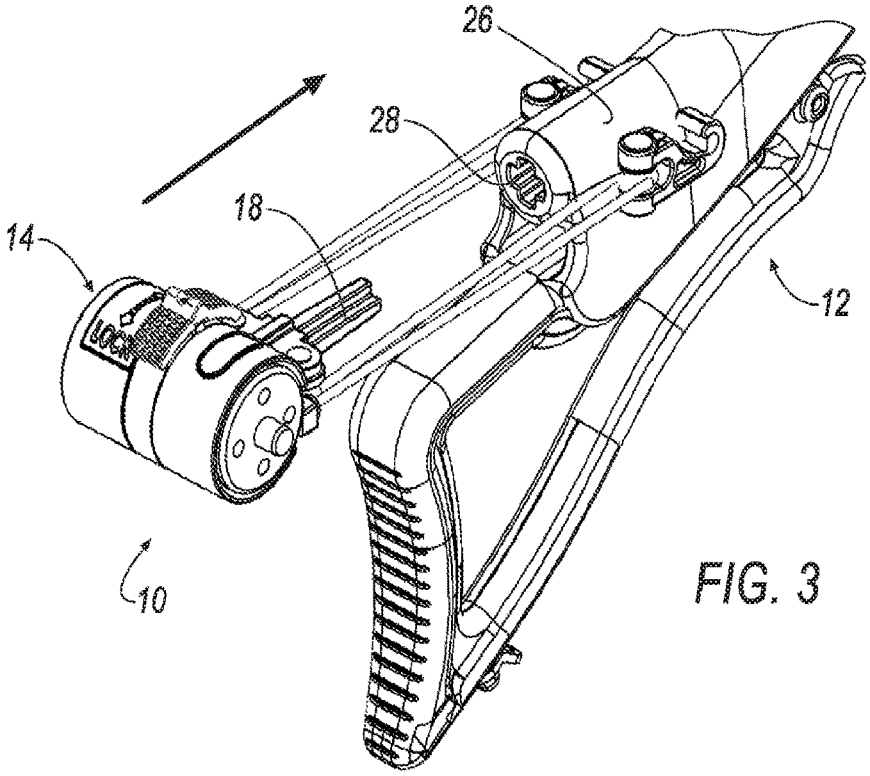
FIG. 3 is a close up perspective view of an end of the crossbow, as the cocking mechanism is being attached thereto.
Figure 4:
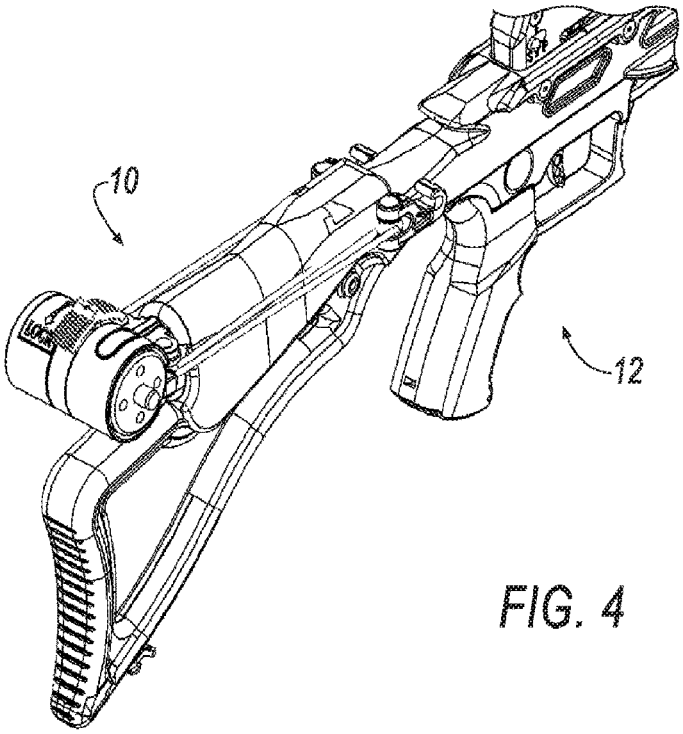
FIG. 4 is a close up perspective view of the cocking mechanism mounted to the crossbow.

Referring to FIGS. 2-4 illustrate how cocking mechanism 10 may be operatively connected to an end of the crossbow 12. In one exemplary arrangement, an end 26 of the crossbow 12 may include a mounting channel 28 (best seen in FIG. 3) which receives the alignment member 18 for frictional engagement. In one arrangement, to insure proper seating of the alignment member 18 within the mounting channel 28, the mounting channel 28 and alignment member 18 may be provided with complementary shapes. For example, in the arrangement depicted, the alignment member 18 is constructed with a cross-shape, and the mounting channel 28 is provided with an internal shape that corresponds to that cross-shape. However, it is understood that the present disclosure is not limited to the shape of the alignment member 18. Moreover, it is also contemplated that other mechanisms for attaching the cocking mechanism 10 to a crossbow 12 are also within the scope of the disclosure.

Figure 5A:
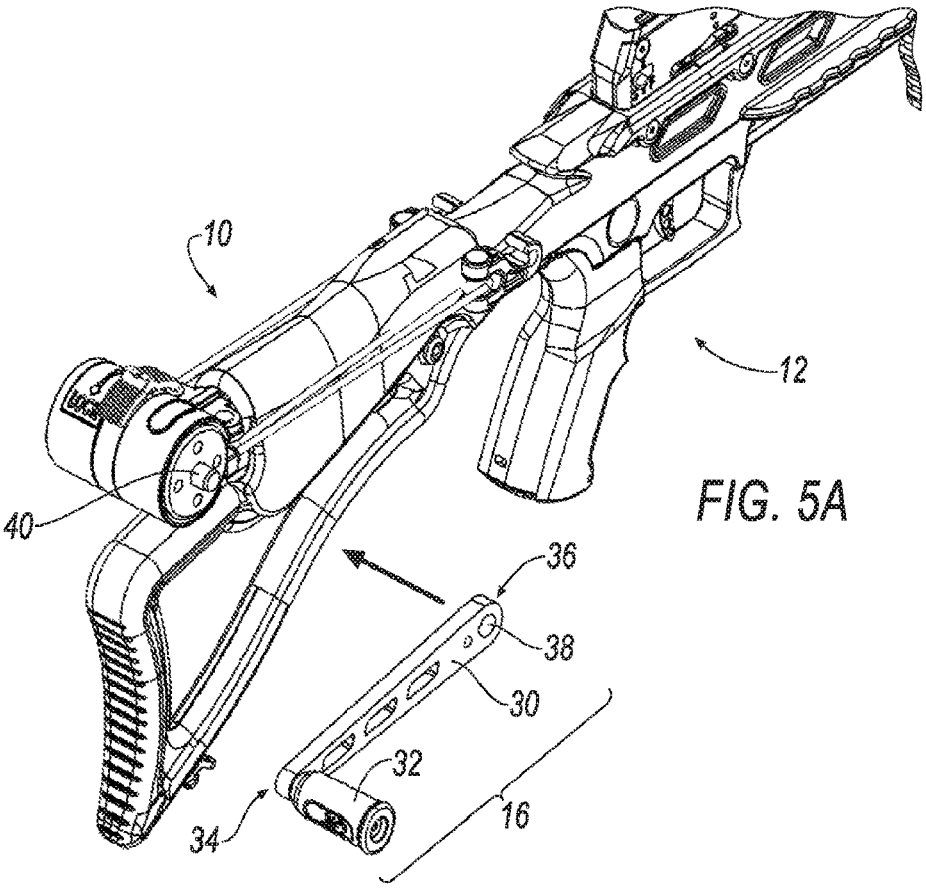
FIG. 5A is a close up perspective view of a hand crank being mounted to the cocking mechanism.
Figure 5B:
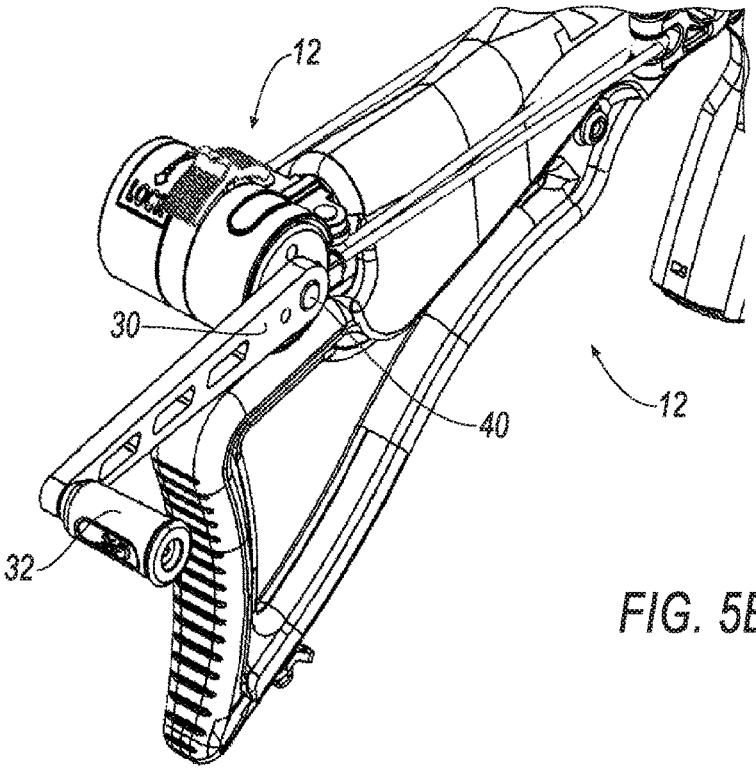
FIG. 5B is a close up perspective view of the hand crank mounted on the cocking mechanism.
Figure 6A:
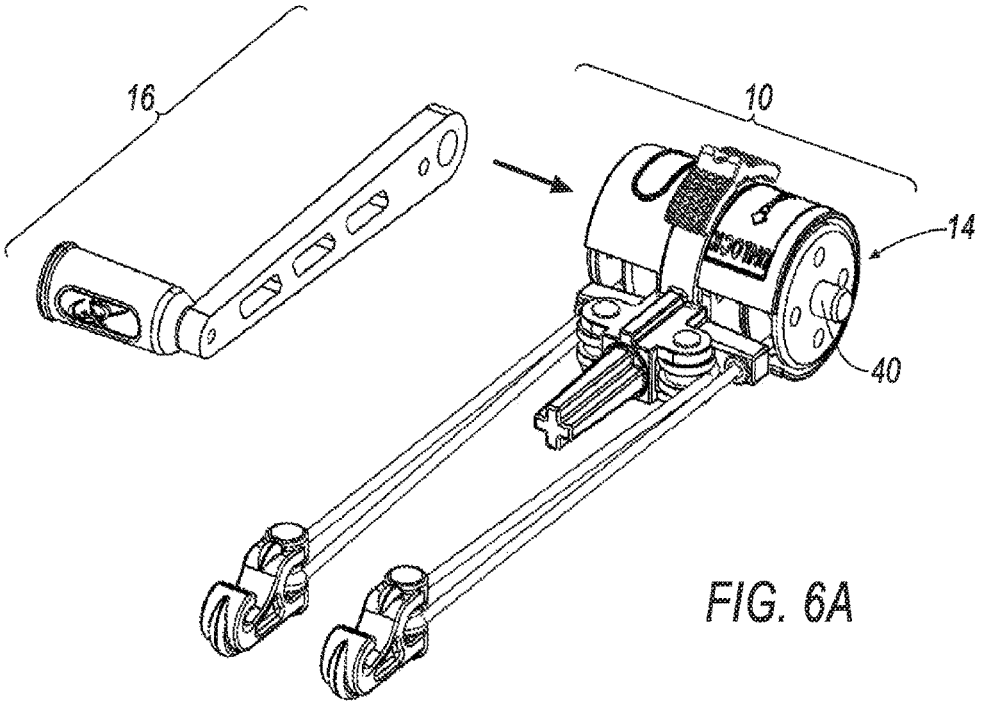
FIGS. 6A-6B are close up perspective views of alternative mounting arrangements for the hand crank on the cocking mechanism.
Figure 6B:
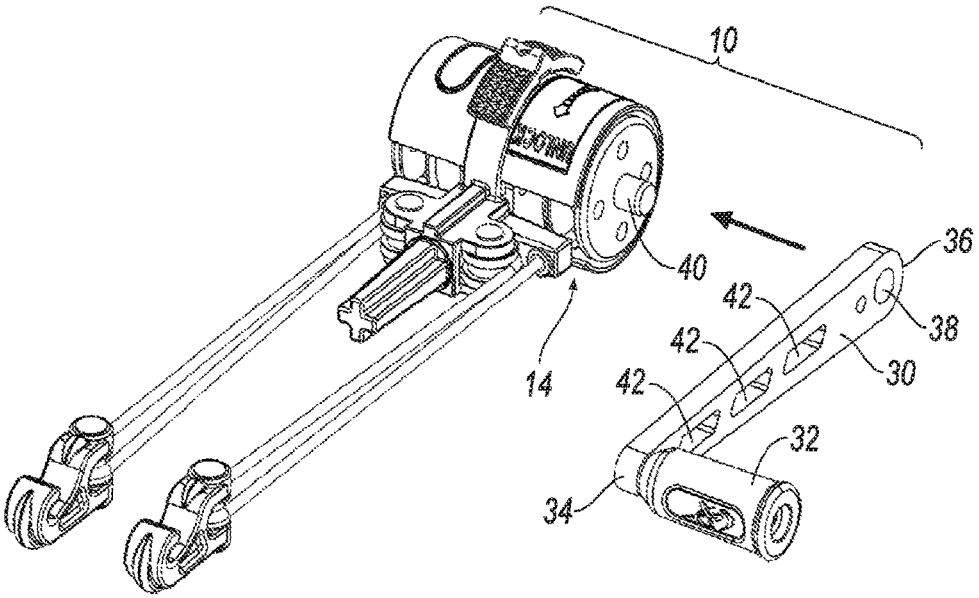

Once the cocking mechanism 10 is mounted to the end 26 of the crossbow 12, the hand crank assembly 16 may be mounted to the actuator assembly 14. Referring to FIGS. 5A-5B, hand crank assembly 16 comprises a shaft element 30 and a hand grip 32. The hand grip 32 is fixedly attached to one side of the shaft element 30 by a suitable fastener (not shown) at a first end 34 of the shaft element 30. At a second end 36 of the shaft element 30, an opening 38 is formed. Opening 38 is configured to receive a portion of a support axle 40 of the actuator assembly 14. To removeably attach the hand crank assembly 16, the opening 38 is aligned with the support axle 40 on one side of the actuator assembly 14, and the shaft element 30 is slid over the support axle 40, through the opening 38, as shown in FIGS. 5A-5B. As the support axle 40 extends outwardly from the actuator assembly 14 on both sides, hand crank assembly 16 may be selectively mounted on either side to allow for both right and left hand users (as demonstrated in FIGS. 6A-6B). To reduce weight of the hand crank assembly 16, material may be removed in the shaft element 30, thereby creating one or more void areas 42.

Figure 7:
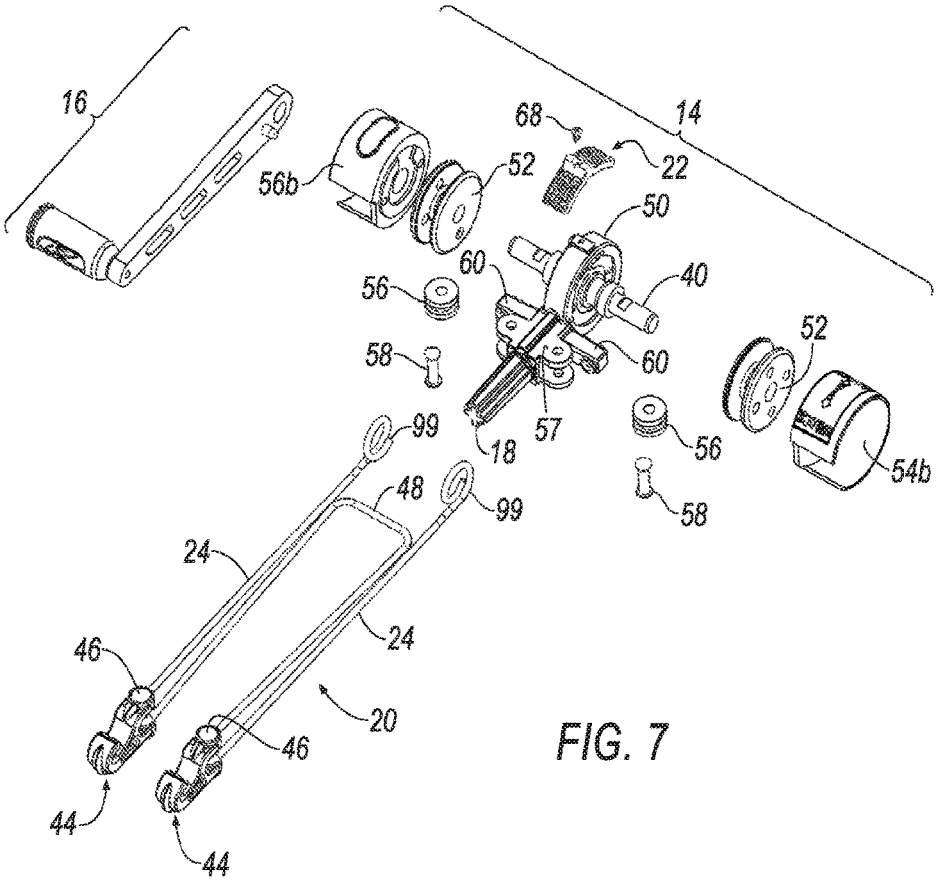
FIG. 7 is an exploded view of the cocking mechanism.

Referring to FIGS. 7-16 various components of the bow string hook assembly 20 and actuator assembly 14, will now be described. The bow string hook assembly 20 includes a pair of hook members 44 to which the tension cable 24 is attached. More specifically, ends of the hook members 44 include a shaft member 46 that the tension cable 24 is directed around. A section 48 of tension cable 24 extends between the hook members 44, but spaced away from the hook members 44, as best seen in FIG. 7.

The actuator assembly 14 comprises a main support body 50, through which the support axle 40 is mounted, the actuator lock member 22, a pair of take-up spools 52, cable guide and take-up spool housings 54a, 54b, a pair of pulleys 56, and a pair of pulley axles 58. A cable eyelet mount 60 is secured to the main support body 50. The cable eyelet mount 60 includes eyelet openings 62 through which the tension cable 24 extends. Extending from the cable eyelet mount 60 is the alignment member 18. A pulley mount 57 is positioned between the cable eyelet mount 60 and the alignment member 18. The pulleys are positioned within the mount 57 and the pulley axle 58 secures the pulleys 56 thereto.

Figure 8:
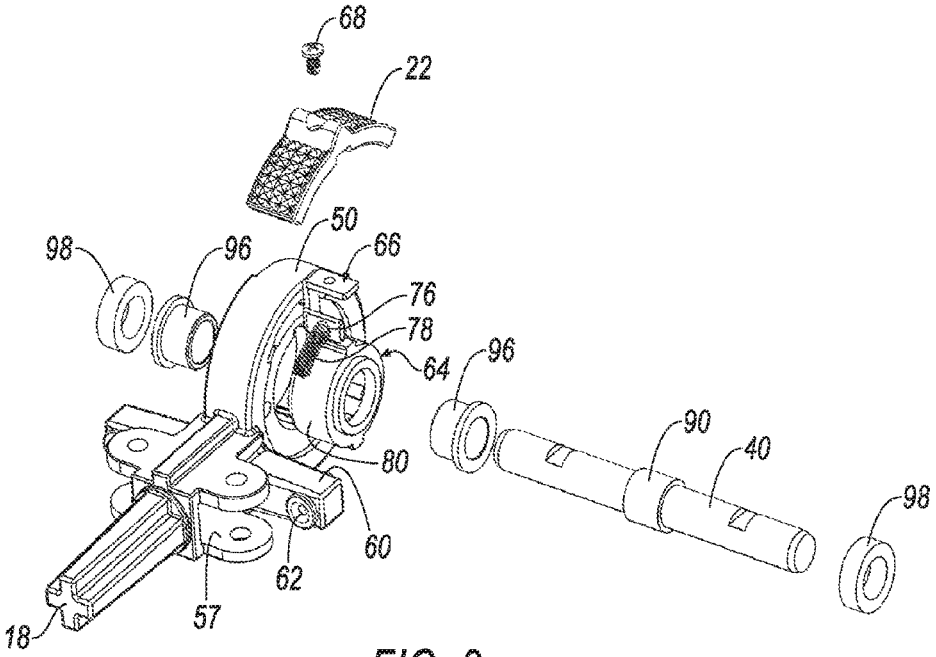
FIG. 8 is an enlarged view of an actuator assembly of the cocking mechanism.
Figure 9:
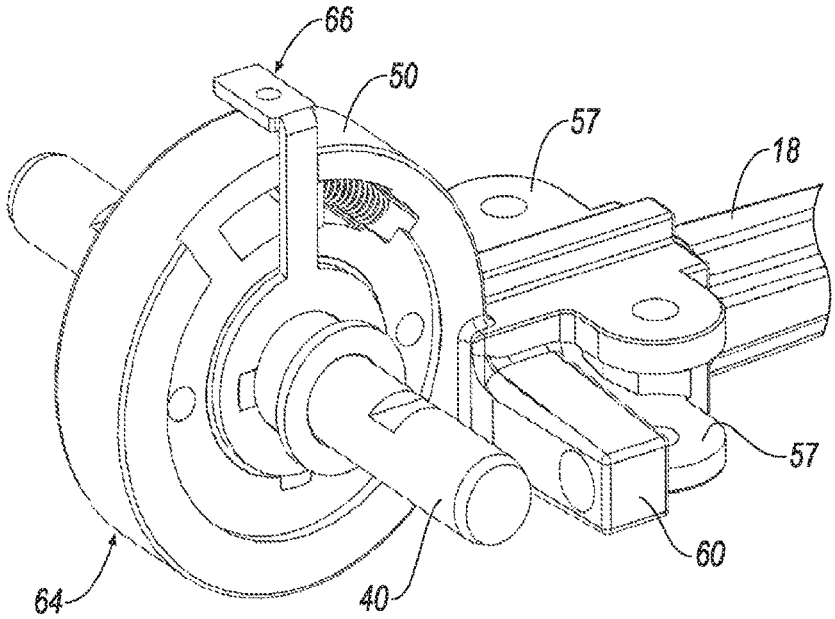
FIG. 9 is a side perspective view of the actuator assembly of FIG. 8.
Figure 10:
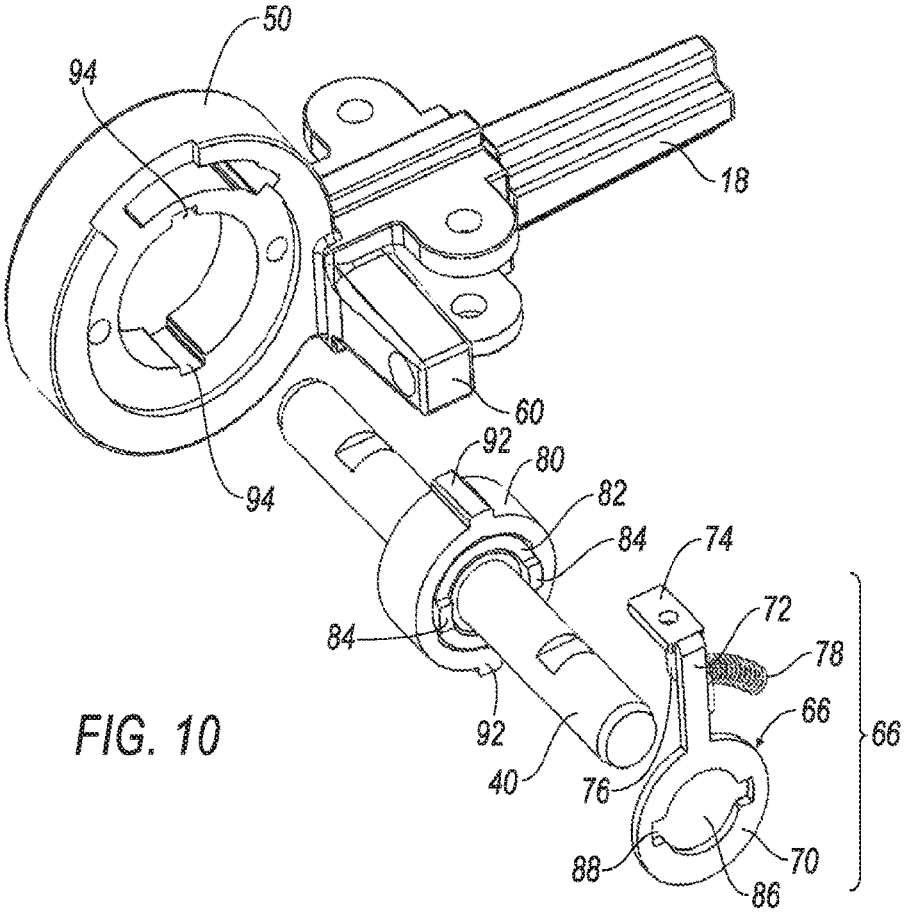
FIG. 10 is an exploded view of clutch components of the actuator assembly of FIG. 8.
Figure 11:
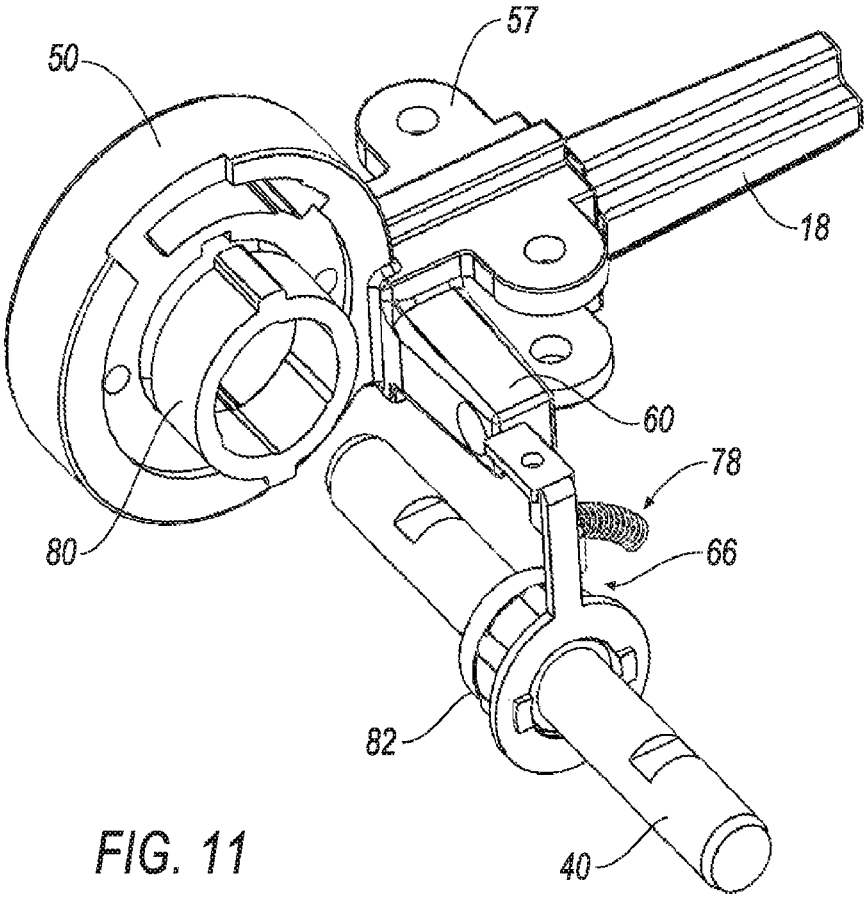
FIG. 11 is a partially assembled view of the clutch components of FIG. 10.

Referring to FIGS. 8-9, a clutch assembly 64 is depicted. The clutch assembly 64 includes an actuator lever 66 that extends upwardly and is disposed over the main support body 50. The actuator lock member 22 attaches to the actuator lever 66 via a fastener 68, once the actuator assembly 14 is assembled. As shown in FIG. 10, actuator lever 66 includes an attachment portion 70 and an extension member 72. Extension member 72 is fixedly attached to, and extends upwardly from, the attachment portion 70. A lever 74 extends from the extension member 72 and connects to the actuator lock member 22. An opening 86 (best seen in FIG. 8) is formed through a spring mount 76 that is secured to the extension member 72. An actuator return spring 78 is secured to the spring mount 76.

Figure 12:
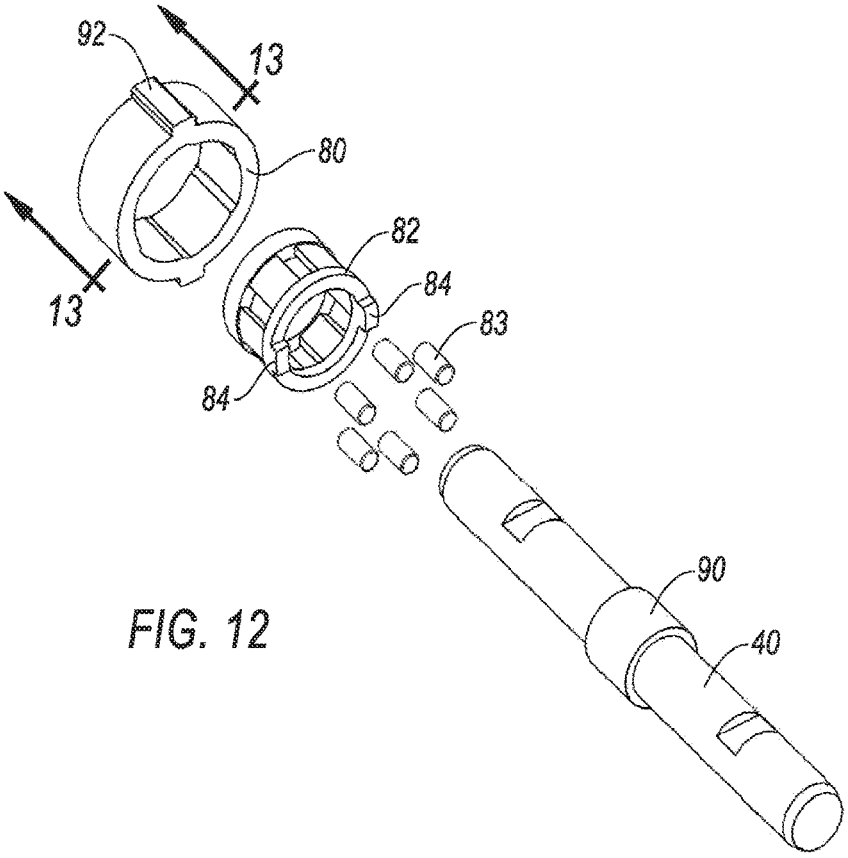
FIG. 12 is an exploded view of a bearing arrangement of the clutch components of FIG. 10.

The clutch assembly 64 further comprises a bearing housing 80 into which a bearing cage 82 is positioned. As shown in FIG. 12, roller bearings 83 are disposed within bearing cage 82. Locating elements 84 are positioned on the bearing cage 82. An opening 86 in the attachment portion 70 of the actuator lever 66 includes locating grooves 88 that are complementary to the locating elements 84. The locating grooves 88 receive the locating elements 84 to secure the actuator lever 66 to the clutch assembly 64. The support axle 40 includes an integral collar 90 that is seated within the bearing cage 82. The bearing housing 80 also includes locating elements 92 on an outside surface thereof. Locating elements 92 are received within mating locating grooves 94 formed in the main support body 50. This arrangement prevents rotation of the bearing housing 80 within the main support body 50. Axle bearings 96 (best seen in FIG. 8) are disposed over the support axle 40, on either side of the collar 90, as are outer spacers 98.

Ends 99 of tension cables 24 are secured to take up spools 52. The take up spools 52 are mounted onto the support axle 40 on either side of the main support body 50. The cable guide and take-up spool housings 54a, 54b are disposed over the take up spools 52.

Figure 13:
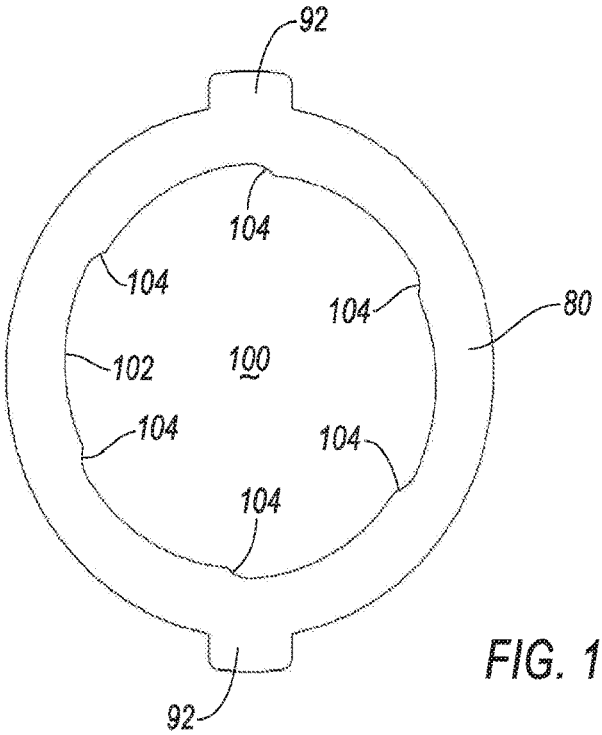
FIG. 13 is a cross-sectional view of a bearing housing taken along lines 13-13 of FIG. 12.

As show in FIG. 13, an opening 100 through the bearing housing 80 is further defined by an inner peripheral surface 102. The inner peripheral surface 102 includes a plurality of inwardly protruding annular ramps 104.

Referring to FIG. 2, attachment and operation of the cocking mechanism 10 will now be described. The crossbow 12 comprises a frame 112 having a barrel 114, a stock 116 and a riser 110. The bow string 106 is secured to first and second limbs 108a, 108b, via pulleys 109. An end of each of the first and second limbs 108a, 108b are secured to the riser 110. The cocking mechanism 10 is secured to the crossbow 12 by mounting the cocking mechanism 10 to the stock 116. In one exemplary arrangement, the stock 116 is provided with the mounting channel 28 formed on the end of the stock 116 and the cocking mechanism 10 includes an alignment member 18 that is received within the mounting channel 28.

Once the cocking mechanism 10 is secured to the crossbow 12, a user pushes the actuator lock member 22 in a first direction (i.e., forward) to an unlock position, which results in a first rotation direction (i.e., clockwise) of the bearing cage 82. The roller bearings 83 will now allow the support axle 40 to rotate in either annular direction. With the actuator lock member 22 in the unlock position, the user then pulls the hook members 44 of the bow string hook assembly 20 toward the bow string 106 of the crossbow 12. After positioning the hook members 44 on the bow string 106, the user releases the actuator lock member 22 and the spring 78 biases the actuator lock member 22 to a second position. The user may then attach the selectively removable hand crank assembly 16 to the cocking mechanism 10.

Once the hand crank assembly 16 is attached to the cocking mechanism 10, the user then rotates the hand crank assembly 16 in the first direction, this results in winding the tension cable 24 onto the take-up spools 52 in a manner of equal force imparted by each hook members 44 onto the bow string 106. Equal force during the cocking operation is important to the consistency and accuracy of the crossbow shot.

One feature of the present disclosure is that the spring 78 always acts to push the actuator lock member 22 in the second direction (backward) to a lock position, which results in a second rotational direction (i.e., counterclockwise). If the user releases his/her grip on the hand crank assembly 16 at anytime during the cocking operation, the bearings 83 will immediately rotate back into a most counterclockwise position and will apply an immediate braking action to any forward return movement of the bow string 106 to its uncocked position.

Once the bow string 106 is pulled into the fully cocked position via use of the hand crank assembly 16, the user then pushes the actuator lock member 22 forward once again to release tension on the bow string 106 by rotating the hand crank assembly 16 in the counterclockwise direction. Once the tension is released, the hook members 44 can be removed from the bow string 106.

Figure 14:
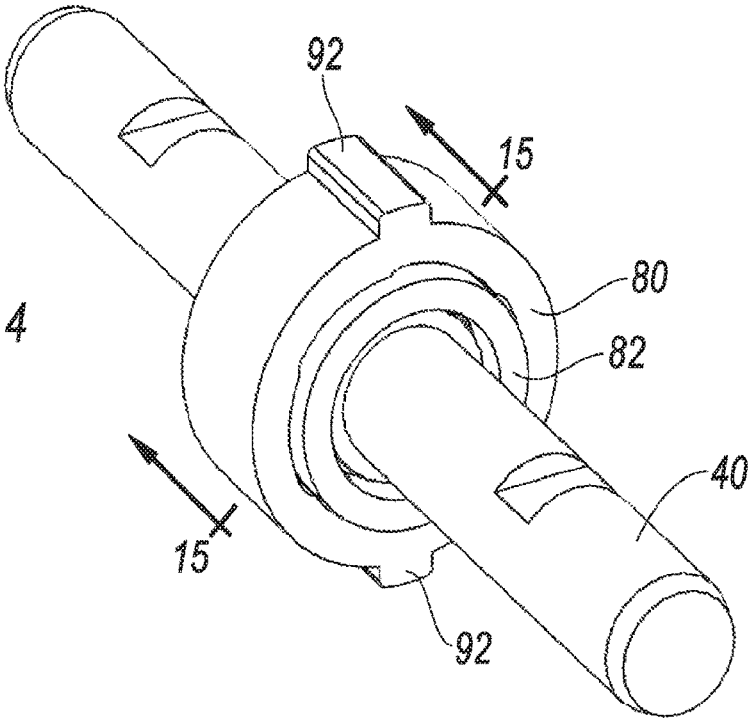
FIG. 14 is a perspective view of the bearing housing with the bearing arrangement assembled.
Figure 15:
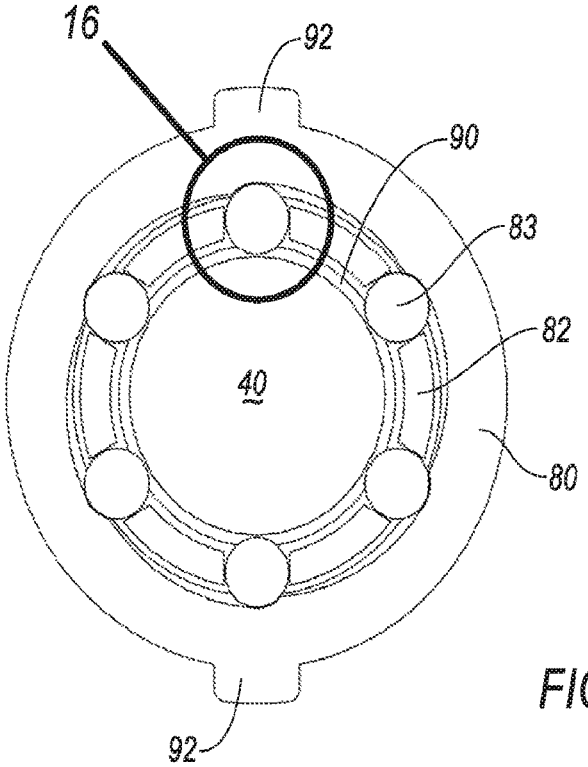
FIG. 15 is a cross-section view of the bearing arrangement, taken along lines 15-15 of FIG. 14.
Figure 16A:
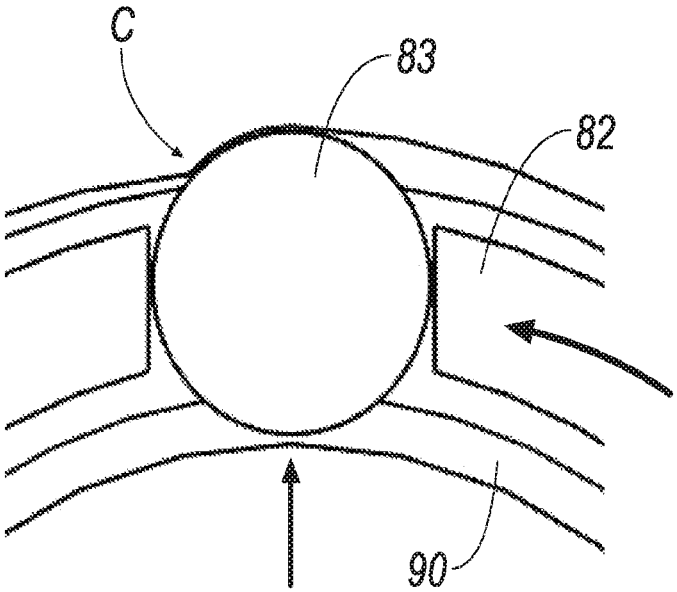
FIG. 16A illustrates a close up of area 16 in FIG. 15 during a counterclockwise operation.
Figure 16B:
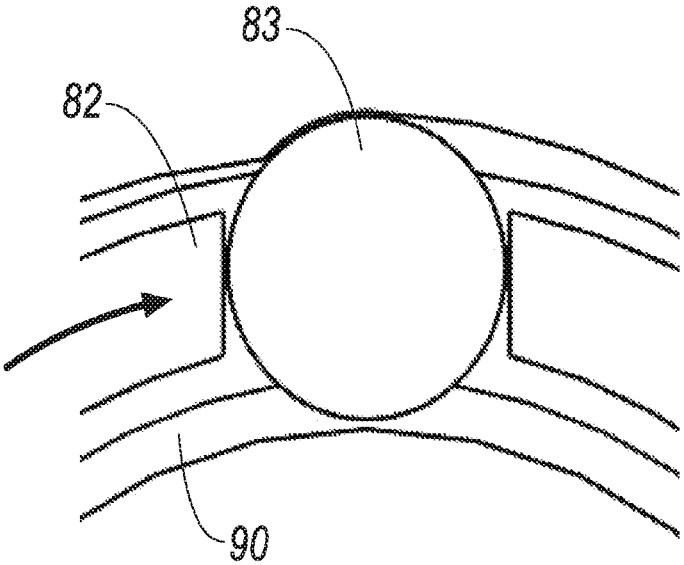
FIG. 16B illustrates a close of up of area 16 in FIG. 15 during a clockwise operation.

The mechanics of the clutch operation are explained below in connection with FIGS. 14-16. While the bearing cage 82 is in the counterclockwise most position, this orientation causes the roller bearings 83 to roll up the annular ramps 104 that are located on the inner peripheral surface 102 of the bearing housing 80. While the roller bearings 83 are in this position at the top of the ramps 104, the roller bearings 83 press firmly against both the inside surface of the bearing housing 80 and the collar 90 of the support axle 40. Any further counterclockwise rotation of the support axle 40 results in increasing the radial force of the roller bearings 83 against the support axle 40 to a point that no further counterclockwise rotation of the support axle 40 is allowed. More specifically, the roller bearings 83 will come to rest against the point C of the ramp 104.

Conversely, clockwise rotation of the support axle 40 results in moving the roller bearings 83 down the annular ramps 104 of the bearing housing 80 which then reduce or ultimately eliminate the radial force of the roller bearings 83 against the support axle 40 to a point that both clockwise and counterclockwise rotation of the support axle are both allowed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cocking mechanism, comprising:

an actuator assembly comprising:

a main body;

a clutch assembly housed within the main body;

a support axle extending through the clutch assembly;

a pair of take-up spool housings disposed on opposite sides of the main body;

a pair of take-up spools disposed on the support axle and housed within respective take-up spool housing;

a cable eyelet mount comprising a pair of eyelets, the cable eyelet mount secured to the main body such that the eyelets are on opposite sides of the main body; and a pulley mount comprising a pair of pulleys, the pulley mount disposed adjacent the cable eyelet mount such that the pulleys are on opposite sides of the main body;

a hand crank assembly [removable] *removably* mounted on the support axle; and a bow string hook assembly.

2. The cocking mechanism of claim 1, wherein the clutch assembly comprises:

an actuator lever;

a bearing housing;

a bearing cage disposed within the bearing housing; and a plurality of roller bearings disposed within the bearing cage.

3. The cocking mechanism of claim 2, wherein:

the actuator lever comprises an attachment portion having an opening;

the bearing cage and the opening in the attachment portion comprise one or more complimentary features configured for securing the [attachment] *actuator* lever to the clutch assembly; and the bearing housing and the main body comprise one or more complimentary features configured for inhibiting rotation of the bearing housing within the main body.

4. The cocking mechanism of claim 3, comprising:

a collar integral with the support axle and seated within the bearing cage; and a pair of axle bearings disposed on the support axle on opposite sides of the collar.

5. The cocking mechanism of claim 4, wherein:

the bearing housing comprises an opening defined by an inner peripheral surface;

the inner peripheral surface comprises a plurality of annular ramps; and the actuator lever comprises an actuator return spring configured to bias the actuator lever to a locked position when the actuator lever is released.

6. The cocking mechanism of claim 5, wherein:

the support axle is rotatable in either direction when the actuator lever is moved to an unlocked position;

the support axle is rotatable only in a first direction when the actuator lever is in the locked position; and the support axle is inhibited from [unhindered rotation] *rotating* in a second direction when the actuator lever is in the locked position.

7. The cocking mechanism of claim 6, wherein rotation in the second direction is inhibited by the interaction of the plurality of roller bearings, the inner peripheral surface of the bearing housing, and the integral collar on the support axle with one another.

8. The cocking mechanism of claim 5, wherein the plurality of roller bearings operatively cooperate with the inner peripheral surface of the bearing housing and the integral collar on the support axle to inhibit [unhindered] rotation of the support axle in a second direction when the actuator lever is in the locked position.

9. The cocking mechanism of claim 1, wherein the bow string hook assembly comprises:

a pair of hook members; and a tension cable extending through the pair of hook members, wherein:

a section of the tension cable between the pair of hook members extends through the pair of pulleys; and

[opposite ends of] the tension cable [extend] *extends* through the pair of eyelets and [are] *is* secured to the pair of take-up spools.

10. The cocking mechanism of claim 9, wherein the pair of hook members are configured for being removably attached to a bow string[on opposite sides of a crossbow]; and the cocking mechanism imparts substantially equal force onto the bow string when the tension cable is wound onto the [take-spool] *take-up spools*.

11. The cocking mechanism of claim 1, configured for being removably attached to a crossbow.

12. The cocking mechanism of claim 11, comprising:

an alignment member extending from the cable eyelet mount; and a mounting channel in the crossbow;

wherein the alignment member and the mounting channel comprise complimentary features.

13. The cocking mechanism of claim 1, wherein the hand crank assembly is mountable on either side of the actuator assembly.

14. A crossbow[assembly], comprising a cocking mechanism comprising:

an actuator assembly comprising:

a main body;

a clutch assembly housed within the main body;

a support axle extending through the clutch assembly;

a pair of take-up spool housings disposed on opposite sides of the main body;

a pair of take-up spools disposed on the support axle and housed within respective take-up spool housing;

a cable eyelet mount comprising a pair of eyelets, the cable eyelet mount secured to the main body such that the eyelets are on opposite sides of the main body; and a pulley mount comprising a pair of pulleys, the pulley mount disposed adjacent the cable eyelet mount such that the pulleys are on opposite sides of the main body;

a hand crank assembly [removable] *removably* mounted on the support axle; and a bow string hook assembly.

15. The crossbow [assembly] of claim 14, wherein the clutch assembly comprises:

an actuator lever, comprising:

an actuator return spring configured to bias the actuator lever to a locked position when the actuator lever is released; and an attachment portion having an opening;

a bearing housing comprising an opening having a plurality of annular ramps on a peripheral surface of the opening;

a bearing cage disposed within the bearing housing; and a plurality of roller bearings disposed within the bearing cage;

wherein, the bearing cage and the opening in the attachment portion comprise one or more complimentary features configured for securing the [attachment] *actuator* lever to the clutch assembly; and the bearing housing and the main body comprise one or more complimentary features configured for inhibiting rotation of the bearing housing within the main body.

16. The crossbow of claim 15, wherein the support axle is rotatable in either direction when the actuator lever is moved to an unlocked position;

the support axle is rotatable only in a first direction when the actuator lever is in the locked position; and the support axle is inhibited from [unhindered rotation] *rotating* in a second direction when the actuator lever is in the locked position.

17. The crossbow of claim 16, wherein rotation in the second direction is inhibited by the interaction of the plurality of roller bearings, the inner peripheral surface of the bearing housing, and [the] *an* integral collar on the support axle with one another.

18. The crossbow of claim 17, wherein the bow string hook assembly comprises:

a pair of hook members configured for being removably attached to a bow string[on opposite sides of the crossbow];

a tension cable extending through the pair of hook members, wherein:

a section of the tension cable between the pair of hook members extends through the pair of pulleys; and

[opposite ends of] the tension cable [extend] *extends* through the pair of eyelets and [are] *is* secured to the pair of take-up spools; and the cocking mechanism imparts substantially equal force onto the bow string when the tension cable is wound onto the [take-spool] *take-up spools*.

19. The crossbow of claim [18] *14*, wherein the cocking mechanism is removably attached to the crossbow.

20. The crossbow of claim 19, comprising:

an alignment member extending from the cable eyelet mount; and a mounting channel in the crossbow;

wherein the alignment member and the mounting channel comprise complimentary features.

*21. A cocking mechanism, comprising:*

*an actuator assembly comprising:*

*a main body;*

*a clutch assembly housed within the main body;*

*a support axle extending through the clutch assembly; and*

*a pair of take-up spools mounted on the support axle on opposite sides of the main body;*

*a bow string hook assembly, comprising:*

*a pair of hook members; and*

*a tension cable extending through the pair of hook members;*

*wherein,*

*a section of the tension cable between the pair of hook members is spaced away from the hook members; and*

*opposing ends of the tension cable are secured to the take-up spools; and*

*a hand crank removably mounted on the support axle.*

*22. The cocking mechanism of claim 21, wherein the clutch assembly comprises:*

*a bearing housing;*

*a bearing cage disposed within the bearing housing; and*

*a plurality of roller bearings disposed within the bearing cage.*

*23. The cocking mechanism of claim 22, comprising an actuator lever comprising an attachment portion having an opening, wherein:*

*the bearing cage and the opening in the attachment portion comprise one or more complimentary features configured for securing the actuator lever to the clutch assembly; and*

*the bearing housing and the main body comprise one or more complimentary features configured for inhibiting rotation of the bearing housing within the main body.*

*24. The cocking mechanism of claim 23, comprising:*

*a collar integral with the support axle and seated within the bearing cage; and*

*a pair of axle bearings disposed on the support axle on opposite sides of the collar.*

*25. The cocking mechanism of claim 24, wherein:*

*the bearing housing comprises an opening defined by an inner peripheral surface; and*

*the inner peripheral surface comprises a plurality of annular ramps.*

*26. The cocking mechanism of claim 25, wherein the actuator lever comprises an actuator return spring configured to bias the actuator lever to a locked position when the actuator lever is released.*

*27. The cocking mechanism of claim 26, wherein:*

*the support axle is rotatable in either direction when the actuator lever is moved to an unlocked position;*

*the support axle is rotatable only in a first direction when the actuator lever is in the locked position; and*

*the support axle is inhibited from unhindered rotation in a second direction when the actuator lever is in the locked position.*

*28. The cocking mechanism of claim 27, wherein rotation in the second direction is inhibited by the interaction of the plurality of roller bearings, the inner peripheral surface of the bearing housing, and the integral collar on the support axle with one another.*

*29. The cocking mechanism of claim 26, wherein the plurality of roller bearings operatively cooperate with the inner peripheral surface of the bearing housing and the integral collar on the support axle to inhibit unhindered rotation of the support axle in a second direction when the actuator lever is in the locked position.*

*30. The cocking mechanism of claim 21, wherein the pair of take-up spools are housed within respective take-up spool housing.*

*31. The cocking mechanism of claim 21, comprising a pair of eyelets on opposite sides of the main body.*

*32. The cocking mechanism of claim 31, wherein the tension cable extends through the pair of eyelets.*

*33. The cocking mechanism of claim 21, comprising a pair of pulleys on opposite sides of the main body.*

*34. The cocking mechanism of claim 33, wherein the section of the tension cable between the pair of hook members extends around the pair of pulleys.*

*35. The cocking mechanism of claim 21, wherein*

*the pair of hook members are configured for being removably attached to a bow string; and*

*the cocking mechanism imparts substantially equal force onto the bow string when the tension cable is wound onto the take-up spools.*

*36. The cocking mechanism of claim 21, comprising an alignment member for removably attaching the cocking mechanism to a crossbow.*

*37. The cocking mechanism of claim 21, wherein the hand crank is mountable on either side of the actuator assembly.*

* * * * *